United States Patent [19]

Sherman

[11] Patent Number: 5,471,892

[45] Date of Patent: Dec. 5, 1995

[54] MULTI-SPEED PARALLEL AXIS THREE COUNTERSHAFTS AND AN OUTPUT SHAFT POWER TRANSMISSION

[75] Inventor: James F. Sherman, Brighton, Mich.

[73] Assignee: General Motors Corporation, Detroit, Mich.

[21] Appl. No.: 230,660

[22] Filed: Apr. 21, 1994

[51] Int. Cl.⁶ ............................ F16H 3/093; F16H 37/02
[52] U.S. Cl. ................... 74/325; 74/331; 475/207
[58] Field of Search .................... 74/665 F, 665 G, 74/665 GE, 325, 331, 333; 475/198, 204, 207

[56] References Cited

U.S. PATENT DOCUMENTS

| | | | |
|---|---|---|---|
| 2,288,254 | 6/1942 | Rich et al. | 74/325 |
| 5,036,718 | 8/1991 | Bulgrien | 74/335 |
| 5,249,475 | 10/1993 | McAskill | 74/331 |

FOREIGN PATENT DOCUMENTS

| | | | |
|---|---|---|---|
| 1-35146 | 2/1989 | Japan | 74/331 |
| 1-79449 | 3/1989 | Japan | 74/325 |
| 1-105040 | 4/1989 | Japan | 74/325 |
| 1-131360 | 5/1989 | Japan | 74/331 |
| 3-74656 | 3/1991 | Japan | 475/207 |
| 659815 | 4/1979 | U.S.S.R. | 74/331 |

*Primary Examiner*—Khoi Q. Ta
*Attorney, Agent, or Firm*—Donald F. Scherer

[57] ABSTRACT

A power transmission has a plurality of parallel axes on each of which is disposed a shaft supporting a pair of selectively operable friction torque transmitting devices and gear members. One of the parallel axes supports an input shaft, which is drivingly connected to two of the other shafts through one-way devices and a chain drive. A transfer shaft is disposed in parallel with the other axes to transmit drive forces from the interconnected shafts to an output shaft. The transfer shaft has a gear member meshing with the gear members on the input driven shafts, which is effective to transmit the drive to the output shaft, which in turn is connected to a conventional output assembly such as a differential.

3 Claims, 4 Drawing Sheets

MULTI-SPEED PARALLEL AXIS THREE COUNTERSHAFTS AND AN OUTPUT SHAFT POWER TRANSMISSION

TECHNICAL FIELD

This invention relates to power transmissions, and more particularly, to multi-speed power transmissions having a parallel axis with multiple input shafts.

BACKGROUND OF THE INVENTION

Multi-speed power transmissions having two or more axes generally extend the shaft members on at least two of the axes in the longitudinal direction of the transmission in order to obtain multiple speed ratios between the shafts. In order to increase the total number of speed ratios, the longitudinal dimension of the transmission increases.

In transverse front wheel drive transmissions, the longitudinal dimension of the transmission is limited by the available tread width and a maximum allowable angle of the drive axles. In passenger type vehicles, this limits the number of ratios available. Also, in countershaft or parallel shaft type transmissions, a ratio using a one-way clutch is generally limited to the first or lowest forward speed ratio.

In some farm tractor type applications, where ground clearance is abundant, the transmission gearing can be assembled on plural parallel shafts with one shaft being an input shaft and other of the shafts being interconnected therewith by gearing. These transmissions cascade the gear ratios, that is, they utilize gears on more than two shafts to establish some of the gear ratios in the transmission. Quite often, these transmissions utilize the same series or a portion thereof for various gear ratios. These transmissions are generally designed to provide a maximum number of close ratio gear steps, such that the operating performance of the tractor will be closely controlled. This number and closeness of gear ratios is not acceptable for passenger type vehicles. Most automobile transmissions are designed to provide four to six forward gear ratios and a reverse gear ratio.

SUMMARY OF THE INVENTION

The present invention provides short axial length by utilizing multiple input shafts which are chain driven from the engine centerline for ratio flexibility. A single countershaft is employed and has a gear mechanism thereon which meshes with gears on the multiple input shafts. Additional ratio flexibility can be provided in the distances between the input shafts and the countershaft. This transmission will provide single step upshift and downshifts through one-way clutches in all forward ratios. This transmission will also provide some skip shift one-way ratio interchanges as long as the gear ratios being interchanged are not located on the same input shaft.

In the preferred embodiment of this invention, the fifth or highest forward speed ratio and the reverse ratio input gear are located on the engine axis. This provides independent ratio selection for the fifth gear, the center distance adjustment which does not affect the idler driven reverse ratio. Fifth gear is driven directly from the engine axis and is not subject to chain losses. Also, the shaft driven directly from the engine does not include a one-way device.

It is therefore an object of this invention to provide an improved multi-speed parallel shaft to power transmission, wherein each pair of forward ratios is driven from a common input shaft which is connected with the engine through one-way devices and chain drive.

It is another object of this invention to provide an improved parallel shaft multi-speed power transmission, wherein single ratio upshift and downshift interchanges performed via one-way drive transmitting devices on the interchange of a friction device.

It is a further object of this invention to provide an improved parallel shaft multi-speed power transmission, wherein one input shaft is driven directly by the engine and is associated with gearing which provides the highest forward speed ratio and a reverse speed ratio and further wherein, at least two other input shafts are chain driven from the engine aligned input shaft through one-way devices to provide at least four more forward speed ratios.

These and other objects and advantages of the present invention will be apparent from the following specification and drawings.

DESCRIPTION OF EXEMPLARY EMBODIMENTS

Figure 1:
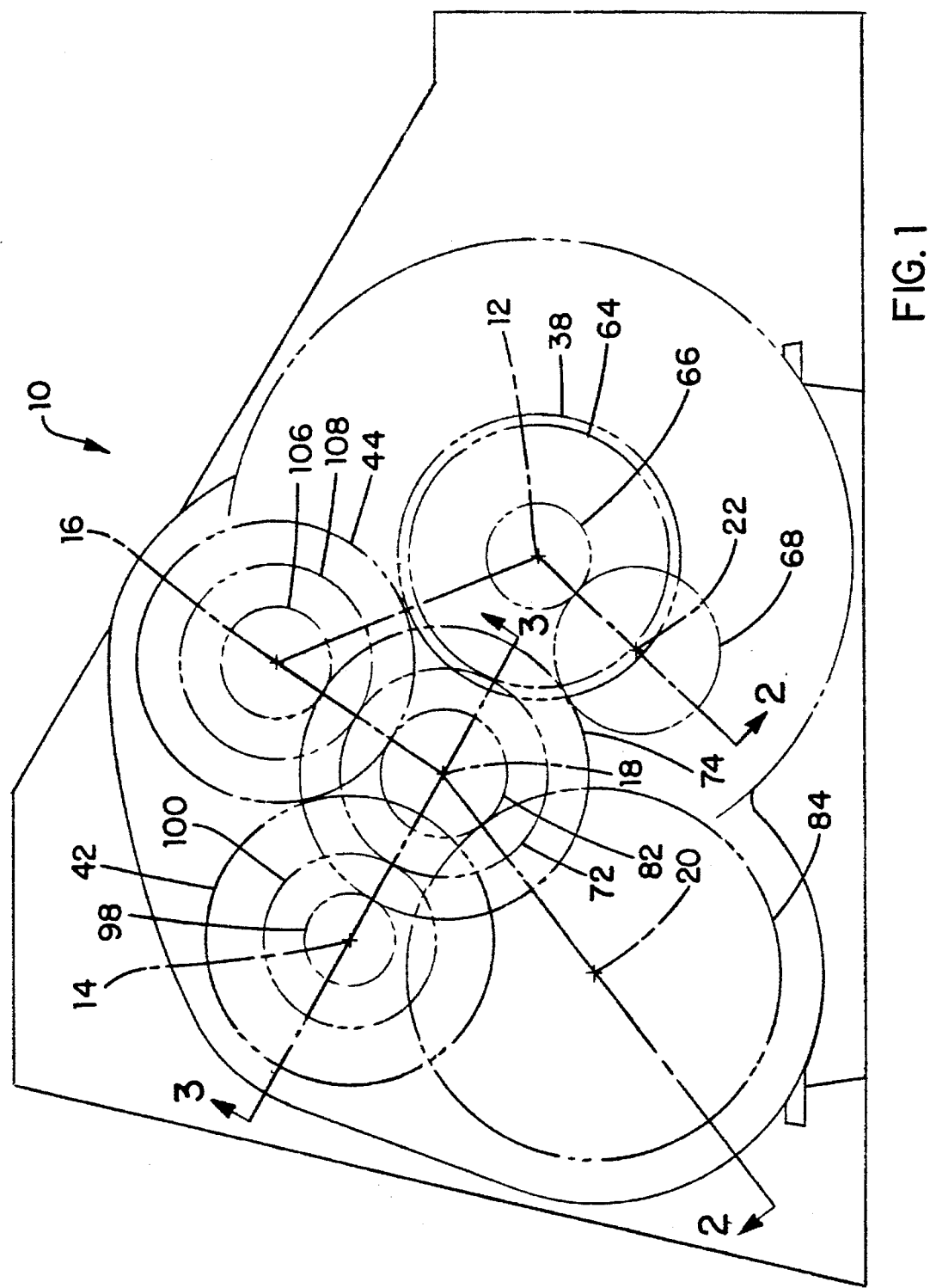
FIG. 1 is a diagrammatic representation of an end view of a transmission incorporating the present invention, showing the location of the axes of the transmission.
Figure 2:
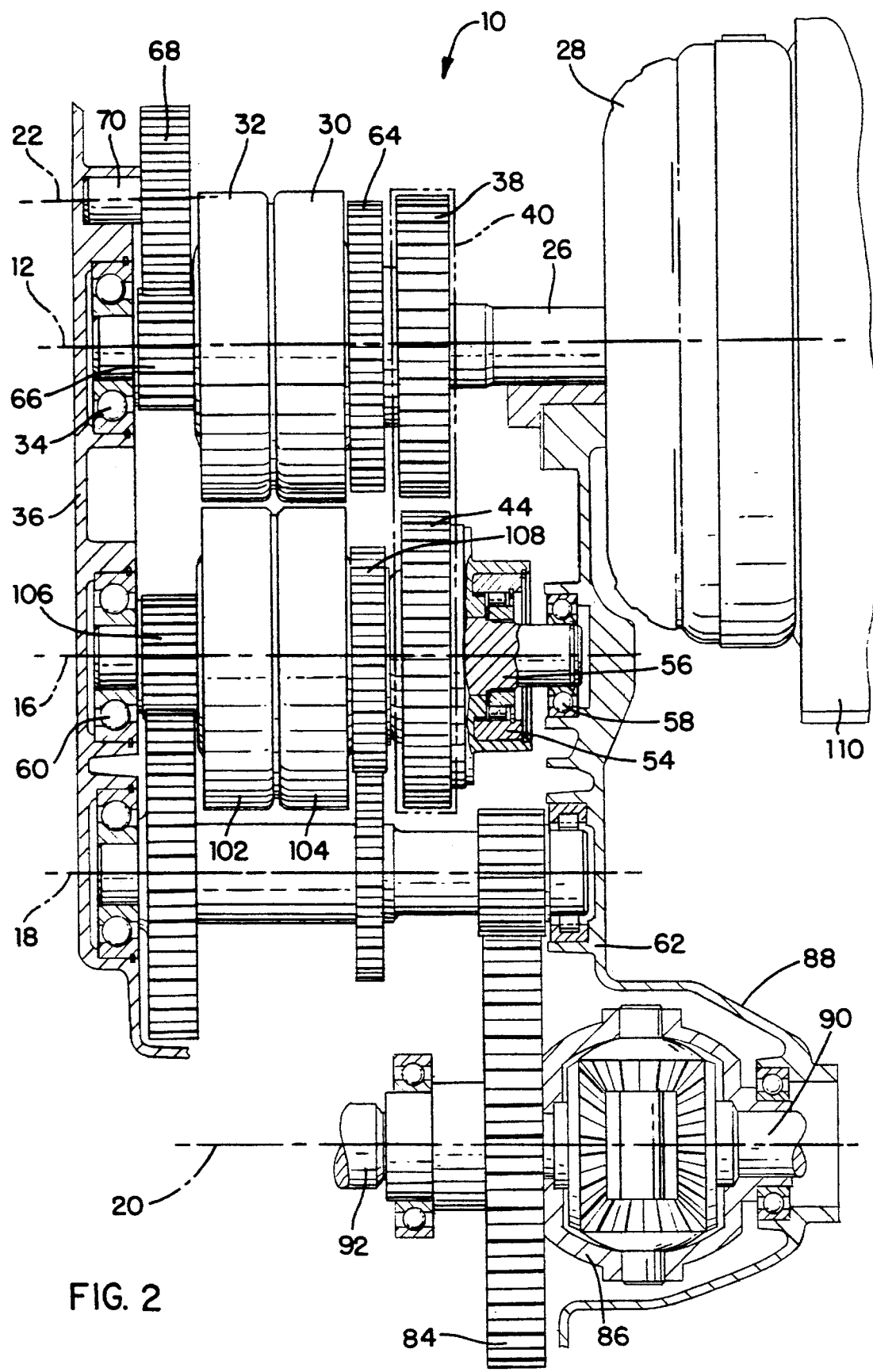
FIG. 2 a sectional view taken along line 2—2 of FIG. 1.
Figure 3:
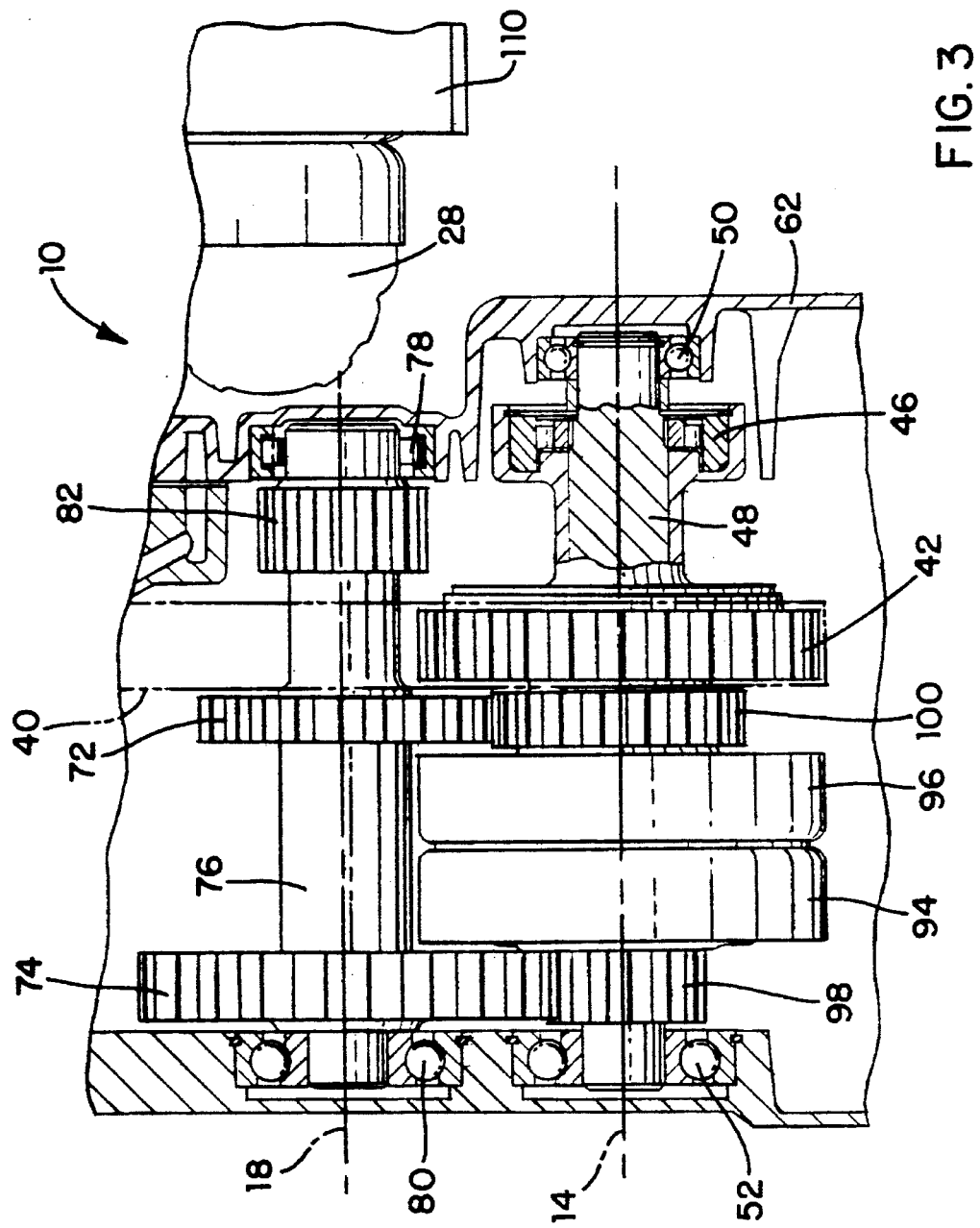
FIG. 3 a sectional view taken along line 3—3 of FIG. 1.

A transmission 10 shown in FIGS. 1, 2 and 3, has a plurality of axes which are aligned in parallel and include an input axis 12, a 1/3 axis 14, a 2/4 axis 16, a transfer or output axis 18, and a differential output axis 20. The transmission shown in FIGS. 1–3 also includes a reverse idler gear axis 22.

Figure 4:
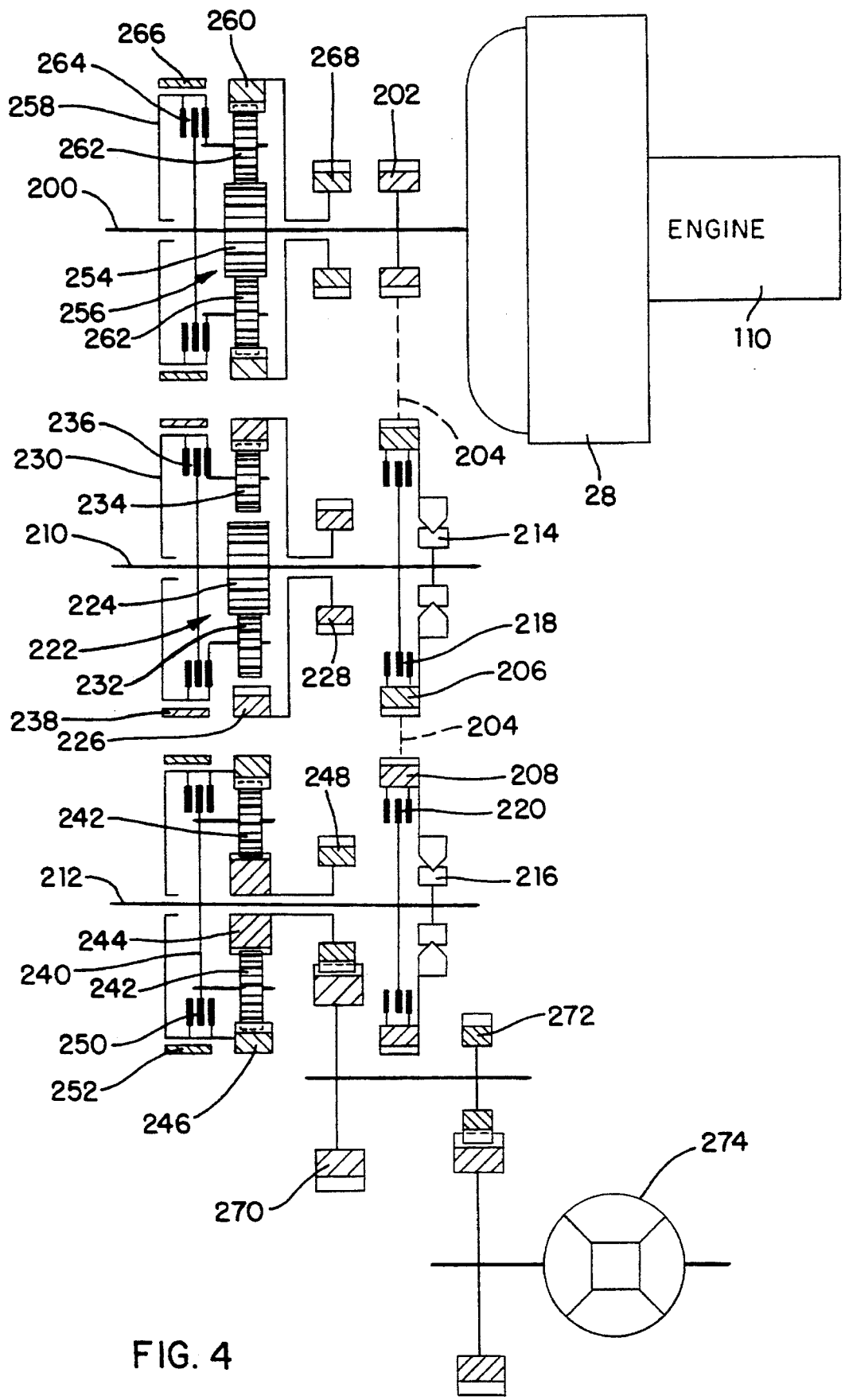
FIG. 4 is diagrammatic representation of an alternative embodiment of the transmission utilizing planetary gearing for the transmission ratios.

The transmission shown diagrammatically in FIG. 4, includes the same axis layout as shown in FIG. 1 with the exception of the reverse idler axis which is not required with the planetary gear arrangement.

The input axis 12 has rotatably supported thereon an input shaft 26 which is drivingly connected with a conventional torque converter 28 and with a pair of conventional fluid operated friction clutches 30 and 32. Clutch 30 will be the fifth ratio clutch and clutch 32 will be the reverse ratio clutch. The input shaft 26 is, as previously mentioned, supported in a bearing 34 which is disposed in a housing or end cover 36.

The input shaft 26 also has drivingly connected therewith a sprocket 38 which is of conventional design. The sprocket 38 is drivingly connected with a chain 40 which interconnects the sprocket 38 with a 1/3 input sprocket 42 and a 2/4 input sprocket 44. The 1/3 sprocket 42 is drivingly connected through a conventional one-way clutch 46 with a 1/3 shaft 48. The shaft 48 is rotatably supported in bearings 50 and 52 on the 1/3 axis 14. The conventional one-way clutch 46 will permit torque transmission from the sprocket 42 to the shaft 48 whenever the sprocket 42 is rotating or attempting to rotate faster than the shaft 48.

The 2/4 sprocket 44 is drivingly connected through a conventional one-way clutch 54 to a 2/4 shaft 56 which is rotatably supported on the axis 16 by a pair of ball bearings 58 and 60. The ball bearings 50 and 58 are rotatably supported in an end cover or housing 62 which forms part of a casing for the transmission 10. The one-way clutch 54 is effective to transmit drive forces between the sprocket 44 and shaft 56 whenever the sprocket 44 attempts to overrun or be driven faster than the shaft 56.

The input shaft 26 rotatably supports a fifth ratio gear 64 and a reverse ratio gear 66. The reverse ratio gear 66 is drivingly or meshingly connected with a reverse idler gear 68 which is rotatably supported on the reverse idler axis 22 on a shaft 70. The fifth ratio gear 64 meshes with a transfer gear 72 and the reverse idler 68 meshes with a transfer gear 74. Both transfer gears 72 and 74 are drivingly connected with a transfer or output shaft 76 which is rotatably supported in bearings 78 and 80 on the axis 18.

Also secured with the shaft 76 is a transmission output gear 82 which drivingly connects or meshes with a differential input gear 84. The differential gear 84 drives a conventional carrier assembly 86 for a conventional differential assembly 88. As is well known, a differential assembly will provide two output members which are shown as output shafts 90 and 92.

The shaft 48 has drivingly connected therewith a pair of selectively engageable clutches 94 and 96 which will operate as the first ratio clutch and third ratio clutch, respectively. The first ratio clutch 94 is drivingly connected with a first ratio gear 98, such that when the clutch 94 is engaged, the ratio gear 98 is drivingly connected with the shaft 48. The third ratio clutch 96 is drivingly connected with a third ratio gear 100, such that when the clutch is engaged, the third ratio gear 100 is drivingly connected with the shaft 48. The first ratio gear 98 and third ratio gear 100 mesh with the transfer gears 74 and 72, respectively.

The shaft 56 has drivingly connected therewith a pair of fluid operated clutches 102 and 104, which are the second and fourth ratio clutches respectively. The clutch 102 is drivingly connected with a second ratio input gear 106 and the fourth clutch 104 is drivingly connected with a fourth ratio gear 108. When the clutch 102 is fluid operated or selectively engaged, the gear 106 will be drivingly connected with the shaft 56. When the clutch 104 is fluid operated in a conventional manner, the gear 108 will be drivingly connected with the shaft 56. The gears 106 and 108 are disposed in meshing relationship with the transfer gears 74 and 72, respectively.

When the torque converter is driven by a conventional internal combustion engine designated 110, the shaft 26 will be rotated. The rotation of the shaft 26 is transferred to the sprockets 38, 42 and 44. If there are not clutches engaged, the transmission output will remain stationary.

When the first ratio clutch 94 is engaged, the first ratio gear 98 will be driven which in turn will drive the gear 74 of the transfer shaft 76 which will cause rotation of the differential input gear 84, and therefore rotation of the output shafts 90 and 92. This will cause movement of the vehicle which has drive wheels attached to the shafts 90 and 92 in a conventional manner.

The transmission can be shifted or have a ratio interchange from the first ratio to the second ratio by engaging the second ratio clutch 102. When the second ratio clutch 102 is engaged, the gear 106 will drive the transfer gear 74 at a more rapid rate for a given engine speed than is available from the first ratio gear 98. This will cause the gear 98 and clutch 94 to drive the shaft 48 more rapidly than the sprocket 42 which is permitted by the one-way clutch 46. Thus, the torque transmission during the second ratio is via the second ratio clutch and the second ratio gear 106.

To employ the third forward ratio, the clutch 96 is engaged which will cause the gear 100 to drive the transfer shaft via gear 72 at a rate faster than the second ratio clutch is capable of driving. The first ratio clutch 94 will be disengaged prior to the engagement of the third ratio clutch.

The fourth forward ratio is accomplished by engaging the clutch 104. This will cause the gear 108 to drive the transfer shaft 76 through transfer gear 72 at a rotatable speed greater than that attainable with the third ratio gear 100 for the given input speed, such that the one-way clutch 46 will overrun to permit this interchange. During the third ratio operation, the second ratio clutch will have been engaged.

To attain the fifth forward ratio, the clutch 30 is engaged which is directly driven by the input shaft 26 and will enforce rotation of the fifth ratio gear 64 which is drivingly connected through the transfer gear 72 to the output shaft 76. The speed of the fifth ratio gear 64 is such that the transfer shaft 76 will be driven at a rate high enough to cause both one-way clutches 54 and 46 to overrun if any of the friction clutches related with their respective shafts are engaged.

It should be evident that all of the upshifts are between friction devices and one-way devices, which as is well known, produce very smooth and pleasable shifts.

The downshifting occurs with opposite manipulation of the clutches, that is, the clutch 104 is engaged. However, torque will not be transmitted by the fourth gear ratio 108 until the fifth ratio clutch is disengaged. The interchange between fourth and third will occur by the engagement of clutch 96 and sometime after that, the disengagement of clutch 104. The 3/2 downshift occurs with the engagement of clutch 102 and the subsequent disengagement of clutch 96. The second to first ratio interchange occurs with the engagement of clutch 94 and the disengagement of clutch 102.

When fifth gear is operating, the fourth ratio clutch 104 can remain engaged and the third ratio clutch 96 can remain engaged. In the alternative, the second ratio clutch 102 can be engaged instead of the fourth ratio clutch 104, or the first ratio clutch 94 can be engaged instead of the third ratio clutch 96. It should be apparent that the clutches 102 and 104 or 96 and 94, cannot be engaged simultaneously, since that would cause a lockup between the respective gear members and the transfer shaft which would prohibit the transmission of any torque. Thus, a skip shift from fourth to second cannot be made utilizing the one-way device 54. However, a very rapid 4-3-2 shift would make it seem like a 4-2 shift might have occurred. Likewise, a 1-3 skip shift or 3-1 skip shift cannot occur. However, a 5-3 skip shift can occur or a 4-1 skip shift can occur.

To establish the reverse drive, the clutch 32 is engaged while all the others are disengaged. This establishes a drive between the reverse gear 66 and the transfer gear 74 via the idler gear 68. This drive path will result in reversal of rotation between the input shaft 26 and the output shafts 90 and 92.

In an exemplary embodiment of the ratios attainable, the transfer gear 74 has fifty-two teeth and the transfer gear 72 has thirty-seven teeth. The first ratio gear 98 has eighteen teeth, the second ratio gear 106 has twenty-two teeth, the third ratio gear 100 has thirty-three teeth, the fourth ratio gear 108 has thirty-seven teeth, and the fifth ratio gear 64 has forty-seven teeth. The reverse ratio gear 66 is provided with eighteen teeth.

The sprocket 38 and the 2/4 sprocket 44 each have thirty-six teeth and the 1/3 sprocket 42 has forty-eight teeth. Thus, the first gear ratio utilizing the sprocket multiplication and the gear ratio multiplication will have an overall ratio of 3.85. The second ratio will have an overall ratio of 2.36 and a step ratio with the first gear of 1.63. The third ratio gear will have a chain multiplier and gear multiplier equal to a total ratio of 1.49 providing a step ratio between second and third of 1.58. The fourth ratio gear will be 1:1 or direct drive having a step ratio with the third gear of 1.49. The fifth ration will provide an overdrive ratio of 0.79 which is a step ratio of 1.27 with the fourth gear. The reverse ratio is 2.89.

The fifth ratio is independent of the other ratios since it is directly driven by the input shaft on the engine centerline and can therefore be adjusted by adjusting the center distance of the input shaft relative to the other shafts and the transfer shaft. The first through fourth ratios can be selectively changed in pairs—first and third and second and fourth—by changing the sprocket ratio between the input shaft 26 and the shafts 48 and 56, respectively. Thus, there is a great deal of flexibility in the gearing ratios attainable with the invention as described in FIGS. 2 and 3.

An alternative embodiment of the invention is shown in FIG. 4. In this embodiment, the engine 110 drives the torque converter 28, which in turn drives an input shaft 200. The input shaft 200 is drivingly connected with a sprocket 202. The sprocket 202 is drivingly connected with a chain 204 which meshes with sprockets 206 and 208 rotatably supported on shafts 210 and 212, respectively. The sprockets 206 and 208 are drivingly connected with the shafts through one-way devices or clutches 214 and 216, respectively.

In the alternative, a fluid operated friction clutch 218 is provided to establish a direct drive connection between the sprocket 206 and the shaft 210 and a fluid operated friction clutch 220 is provided to establish a direct drive between the sprocket 208 and the shaft 212. Similar clutches can be provided for the sprockets 42 and 44 of the transmission shown in FIGS. 2 and 3, should it be desirable to prevent overrunning of the shafts to establish engine coast braking.

It should be appreciated that when the fluid operated friction clutches, such as 218 and 220, are engaged, the one-way shifting advantage is not available.

The shafts 200, 210 and 212 are thus rotatably driven as input shafts by the torque converter 28. The shaft 210 is the first and third ratio shaft and has rotatably mounted thereon a planetary gear arrangement 222 which includes a sun gear 224 drivingly connected with the shaft 210, a ring gear 226 drivingly connected with an output ratio gear 228, and a carrier member 230 which rotatably supports a pair of pinions 232 and 234 meshing with the sun gear 224 and ring gear 226, respectively. The pinions 232 and 234 mesh with each other to provide what is commonly termed a compound planetary gear arrangement.

The sun gear 224 and carrier 230 can be interconnected through a third ratio clutch 236. In the alternative, the carrier 230 can be held stationary by a first ratio brake 238. The clutch 236 and brake 238 are conventional fluid operated friction devices which are well known in the field of planetary transmissions.

The shaft 212 has rotatably secured therewith a planet carrier 240 which rotatably supports pinion gears 242 meshing with a sun gear 244 and a ring gear 246, respectively. The sun gear 244 is drivingly connected with a 2/4 ratio gear 248. The ring gear 246 is drivingly connected with a conventional fluid operated friction clutch 250, which is operable to connect the carrier and the ring gear together, and with a conventional fluid operated brake 252, which is operable to prevent rotation of the ring gear 246 such that an overdrive ratio is provided between the shaft 212 and the ratio gear 248.

The input shaft 200 has rotatably connected therewith a sun gear 254, which is a member of a planetary gear arrangement 256, which also includes a planet carrier 258 and a ring gear 260. The planet carrier 258 has rotatably supported thereon pinion gears 262 which mesh between the sun gear 254 and ring gear 260. The carrier is drivingly connected with a conventional fluid operated fifth ratio clutch 264, which is selectively operable to connect the sun gear and carrier together and provide a 1:1 drive in the planetary gear arrangement 256, and a conventional fluid operated friction brake 266, which is operable to halt rotation of the carrier 258 and thereby effect reverse rotation between the sun gear 254 and the ring gear 260. The ring gear 260 is drivingly connected with a fifth/reverse ratio gear 268.

The gears 228, 248 and 268 are all meshingly engaged with a transfer gear 270, which in turn drives a transmission output gear 272, which establishes a drive to a conventional differential arrangement 274.

As with the transmission described in FIGS. 2 and 3, the sprockets 206 and 208 are provided with one-way drive interfaces between the input shaft 200 and the shafts 210 and 212, respectively. This will permit one-way ratio interchange combinations during upshifts and downshifts of single level ratios or skip shifts between two separate shafts.

To establish the first and lowest forward ratio, the brake 238 is engaged, thereby halting rotation of the carrier 230, such that the gear 228 is driven at a reduced ratio by the planetary gear set 222.

To establish the second forward ratio, the clutch 250 is engaged, which establishes a 1:1 drive ratio between the shaft 212 and the ratio gear 248. The establishment of second gear will cause the transfer gear 270 to be rotated at a speed sufficient to cause overrunning of the one-way device 214. During operation in the second ratio, the brake 238 can be disengaged.

To establish the third forward ratio, the clutch 236 is engaged to establish a 1:1 drive ratio in the planetary gear arrangement 222 and cause overrunning of the one-way device 216.

The fourth forward speed ratio is established by engaging the brake 252 resulting in an overdrive ratio between the carrier 240 the sun gear 244, which will establish the gear 248 as the output gear and drive the transfer gear at a sufficiently high speed to overrun the one-way device 214.

The fifth forward ratio is established by engagement of the clutch 264 by creating a drive ratio in the planetary arrangement 256, which will cause overrunning of one-way clutch 216. The third clutch 236 can be disengaged during fourth gear operation, if desired.

As explained previously, the downshifting or ratios is also accomplished by utilizing the one-way devices and reversing the sequence of operation of the clutches and brakes.

The reverse ratio is established by engaging the friction brake 266 while disengaging all the other clutches and brakes in the transmission. With the brake 266 engaged, the carrier 258 is stationary resulting in a reverse rotation between sun gear 254 and ring gear 260, which results in reverse rotation of ratio gear 268 and the transfer gear 270. This will produce a reverse output at the differential 274.

The planetary gear assemblies can be provided with gears having the following number of teeth. Sun gear 224 will have twenty-one teeth and ring gear 226 will have fifty-four teeth. Sun 244 will have sixty-six teeth and ring gear 246 will have ninety-eight teeth. Sun gear 254 will have twenty-two teeth and ring gear 260 will have seventy-eight teeth. The sprocket 202 will have thirty-two teeth; the sprocket 206 will have fifty-two teeth and the sprocket 208 will have fifty-four teeth.

With this combination of gear teeth, the first and lowest forward speed ratio will be 5.04 and the second ratio will be 3.10, thereby providing a step ratio therebetween of 1.62. The third ratio will be 1.96 to establish a step ratio of 1.58 between second and third. The fourth ratio will be 1.25 to establish a step ratio of 1.56 between third and fourth. The fifth ratio will be 1:1, such that a step ratio of 1.25 is provided between fourth and fifth gears. The reverse ratio will be 3.55.

The transfer gear 270 will have the same number of teeth as the ratio gear 260, namely 70 teeth, while the ratio gear 228 has fifty-eight teeth and the ratio gear 248 has thirty-eight teeth. These tooth numbers are, of course, effective in establishing the ratios of the various gear steps.

The overall ratio of the input shaft to the differential output shafts is further modified by the gear ration between the transmission output gear 82 and differential input gear 84 or the transmission output gear 272 and the input gear to the differential 274.

The manipulation of the number of gear teeth to be utilized in these situations is well known among the transmission designers. What is considered of utmost importance here is the fact that a very short axial length transmission is provided which will produce one-way shift qualities on both upshift and downshift between consecutive ratios in either a countershaft type gearing or in a planetary type gearing arrangement. The amount of axial space taken by either of these of types of transmissions would be quite similar and therefore the interchange from one type to the other could be made in passenger vehicles having the same overall design characteristics for standards.

The embodiments of the invention in which an exclusive property or privilege is claimed are defined as follows:

1. A multi-speed parallel shaft power transmission comprising:
    an input shaft;
    a first input transfer shaft;
    a second input transfer shaft;
    an output shaft;
    a first pair of ratio gear and clutch means operatively connectible with the input shaft and drivingly connected with a pair of gear means on the output shaft;
    a first one-way drive means operatively connected with said first input transfer shaft;
    a second one-way drive means operatively connected with said second input transfer shaft;
    flexible drive means drivingly connected between said input shaft and said first and second one-way drive means;
    a second pair of ratio gear and clutch means operatively connectible with said first input transfer shaft and drivingly connected with the pair of gear means on the output shaft; and
    a third pair of ratio gear and clutch means operatively connectible with said second input transfer shaft and drivingly connected with the pair of gear means on the output shaft.

2. A multi-speed parallel shaft power transmission comprising:
    a first input shaft;
    a second input shaft;
    a third input shaft;
    an output shaft having gear means operatively connected therewith;
    a planetary gear mechanism for providing epicyclic motion and drive establishing means comprised of a fluid operated clutch means and a fluid operated brake means for operatively connecting the planetary gear mechanism between the first input shaft and gear means on the output shaft;
    a first one-way drive means operatively connected with said second input shaft;
    a second one-way drive means operatively connected with said third input shaft;
    drive means drivingly connected between said first input shaft and said first and second one-way drive means;
    second ratio gear means and drive establishing means for operatively connecting the second ratio gear means between the said second input shaft and the gear means on the output shaft; and
    third ratio gear means and drive establishing means for operatively connecting the third ratio gear means between said third input shaft and the gear means on the output shaft.

3. The multi-speed parallel shaft power transmission defined in claim 2, wherein each of said second and third gear means is a planetary gear mechanism and each said drive establishing means comprises a fluid operated clutch means and a fluid operated brake means.

* * * * *